United States Patent [19]
Sathe

[11] Patent Number: 5,880,381
[45] Date of Patent: Mar. 9, 1999

[54] METHOD OF TESTING VEHICLE PARTS

[75] Inventor: Prakash T. Sathe, Bloomfield Hills, Mich.

[73] Assignee: TRW Inc., Lyndhurst, Ohio

[21] Appl. No.: 764,558

[22] Filed: Dec. 12, 1996

[51] Int. Cl.$^6$ .................................................. G01N 19/00
[52] U.S. Cl. ............................................................ 73/865.6
[58] Field of Search ...................... 73/865.6, 118.1, 73/808, 811, 117.1, 117.2, 117.3, 865.9

[56] References Cited

U.S. PATENT DOCUMENTS

| | | |
|---|---|---|
| 3,255,628 | 6/1966 | Anderson et al. . |
| 3,832,894 | 9/1974 | Pelta .......................................... 73/117 |
| 4,186,593 | 2/1980 | Watanabe .................................. 73/117 |
| 4,501,139 | 2/1985 | Petersen ................................. 73/118.1 |
| 4,931,949 | 6/1990 | Hernandez et al. . |
| 5,020,616 | 6/1991 | Yagi et al. .............................. 73/118.1 |
| 5,345,829 | 9/1994 | Yamauchi et al. . |
| 5,602,450 | 2/1997 | Cowan et al. ........................... 73/865.3 |
| 5,610,330 | 3/1997 | Fricke et al. ............................ 73/865.6 |

*Primary Examiner*—Hezron Williams
*Assistant Examiner*—Nashmiya Fayyaz
*Attorney, Agent, or Firm*—Tarolli, Sundheim, Covell, Tummino & Szabo

[57] ABSTRACT

A block cycle of stress-inducing test conditions is repeatedly applied to a vehicle part (302) on a test stand (266). The number of applications of the block cycle is predetermined such that the cumulative test conditions applied to the vehicle part (302) correspond to actual driving conditions previously experienced by one or more prototype vehicle parts (200) throughout a predetermined number of driven miles. When the repetitive block cycles have been completed, the vehicle part (302) is inspected to determine an induced degree of deterioration corresponding to the predetermined number of driven miles. The induced degree of deterioration forecasts actual deterioration expected for a plurality of duplicate vehicle parts under actual driving conditions in vehicles driven the same number of miles.

14 Claims, 5 Drawing Sheets

5,880,381

METHOD OF TESTING VEHICLE PARTS

FIELD OF THE INVENTION

The present invention relates to the testing of vehicle parts, and particularly relates to the testing of vehicle parts that are subject to deterioration through long term use.

BACKGROUND OF THE INVENTION

A vehicle has parts that are subject to deterioration through long term use. The long term reliability of such parts can be forecast by testing a representative sample part on a test stand. The test stand is equipped with actuating devices that run movable portions of the sample part through a large number of repetitive cycles.

For example, a ball joint in a vehicle suspension is subject to deterioration through long term use. The ball joint includes a ball stud which is movable pivotally in a socket. A test stand for a ball joint has actuating devices that repeatedly pivot the ball stud back and forth in the socket. The repetitive cycles of back and forth movements are all the same.

A sample ball joint is tested by running it through a large number of repetitive cycles on the test stand. When the repetitive cycles have been completed, the resulting deterioration of the sample ball joint is measured. The long term reliability of the sample ball joint is thus defined in terms of its ability to withstand a number of cycles on a test stand. The long term reliability of identical ball joints is then forecast in terms of a number of cycles on a test stand.

A rack and pinion steering gear is another example of a vehicle part that is tested for long term reliability on a test stand. The steering gear has a steering rack which is connected at its opposite ends to a vehicle steering linkage. The steering gear further has an input shaft which is connected at its upper end to the vehicle steering wheel. The rack moves longitudinally in response to rotation of the input shaft.

A test stand for a rack and pinion steering gear has actuating devices that cooperate to rotate the input shaft back and forth in opposite directions, and simultaneously to move the rack longitudinally back and forth in opposite directions. A sample steering gear is tested by subjecting it to a large number of repetitive cycles of back and forth movements on the test stand. The long term reliability of identical steering gears is then forecast in terms of a number of cycles on a test stand.

Another type of test stand for a steering gear is equipped with actuating devices that control the ambient temperature and/or apply sprays of water or other environmental factors to simulate environmental conditions that can cause deterioration. A sample steering gear is tested by subjecting it to controlled environmental factors on the test stand. The long term reliability of identical steering gears is further defined and forecast in terms of those controlled factors.

SUMMARY OF THE INVENTION

The present invention provides a method of forecasting the long term reliability of vehicle parts in terms of a number of miles driven in a vehicle.

The method comprises the steps of testing and inspecting a vehicle part. The vehicle part is tested by subjecting it to cumulative test conditions on a test stand. Specifically, a block cycle of test conditions is applied a number of times. The number of times that the block cycle is applied is predetermined such that the cumulative test conditions correspond to actual driving conditions previously experienced by one or more prototype vehicle parts through long term use in a vehicle driven a predetermined number of miles.

When the predetermined number of block cycles has been completed, the vehicle part is inspected to determine the degree of deterioration induced by application of the cumulative test conditions. Since the cumulative test conditions correspond to actual driving conditions over a predetermined number of driven miles, the induced degree of deterioration also corresponds to the predetermined number of driven miles. Accordingly, the induced degree of deterioration indicates the actual deterioration to be expected for identical vehicle parts when they are used in vehicles driven the same number of miles. The long term reliability of the identical vehicle parts is thus defined and forecast in terms of a number of miles driven in a vehicle, rather than being defined and forecast only in terms of a number of repetitive cycles on a test stand.

In accordance with a specific feature of the present invention, the block cycle of test conditions comprises an abridged schedule of test conditions that are compiled from real time recordings of actual driving conditions experienced by one or more prototype vehicle parts in test vehicles. The method further comprises a plurality of preliminary steps that are used to define the block cycle in this manner.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF THE INVENTION

The Vehicle Part

Figure 1:
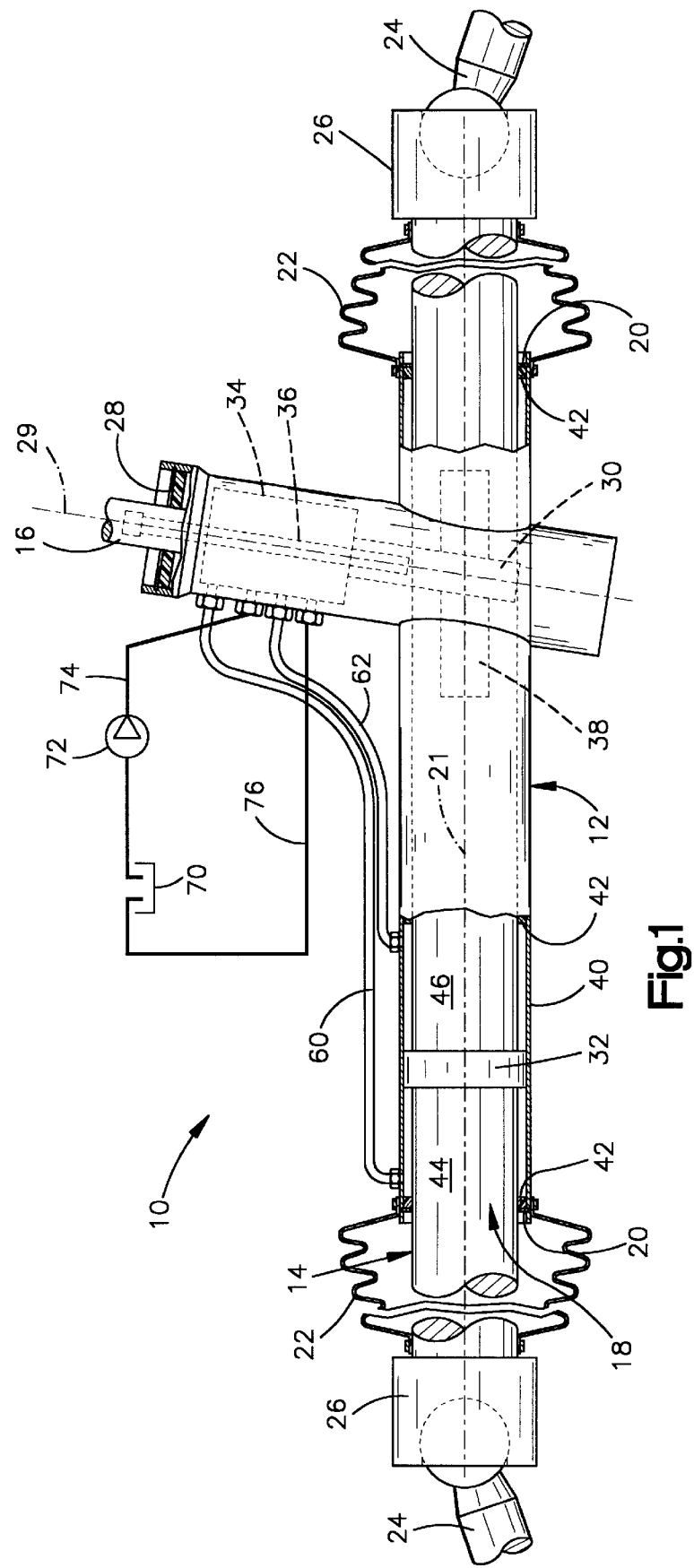
FIG. 1 is a partly schematic view showing an example of a vehicle part that can be tested in accordance with the present invention.
Figure 2:
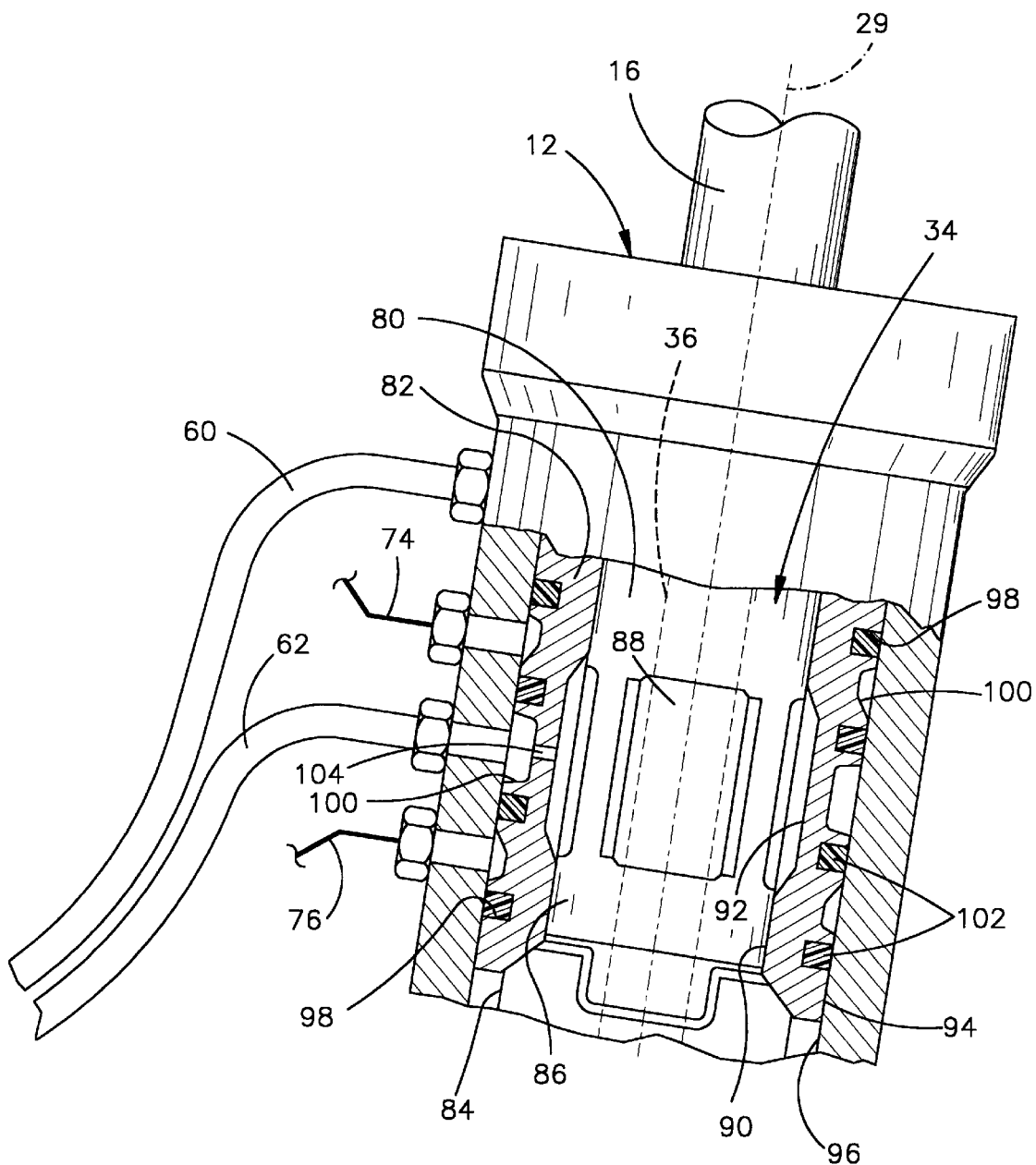
FIG. 2 is an enlarged partial view of the part shown in FIG. 1.

An example of a vehicle part 10 that can be tested in accordance with the present invention is shown in FIGS. 1 and 2. The vehicle part 10 is a hydraulically-assisted rack and pinion steering gear of known construction. As shown schematically in FIG. 1, the steering gear 10 includes a housing 12, an elongate steering rack 14, and an input shaft 16.

The rack 14 extends through a passage 18 in the housing 12, and projects horizontally outward from the housing 12 at opposite ends of the passage 18. A pair of bushings 20 at the opposite ends of the passage 18 support the rack 14 for longitudinal movement along an axis 21. A pair of boot seals 22 enclose the opposite ends of the passage 18. When the steering gear 10 is installed in a vehicle, the rack 14 is connected to a pair of tie rods 24 by a corresponding pair of ball joints 26 at the opposite ends of the rack 14. The tie rods 24 are portions of a steering linkage which connects the steering gear 10 to a pair of steerable vehicle wheels.

The input shaft 16 projects outward from the housing 12 through a seal 28, and is rotatable about another axis 29 in response to rotation of the vehicle steering wheel. The steering gear 10 operates to move the rack 14 longitudinally in response to rotation of the input shaft 16 about the axis 29. The steering gear 10 thus actuates the steering linkage to steer the vehicle wheels in response to rotation of the steering wheel.

Other parts of the steering gear 10 include a pinion gear 30, a piston 32, and a hydraulic fluid control valve 34, each of which is contained in the housing 12. The pinion gear 30 is connected with the input shaft 16 by a torsion bar 36, and is supported for rotation about the axis 29 in meshing engagement with a row of rack teeth 38 on the rack 14. The piston 32 is fixed to the rack 14 within a tubular portion 40 of the housing 12 which functions as a power cylinder. A pair of seals 42 define opposite ends of a pair of variable volume hydraulic fluid chambers 44 and 46 which are located in the power cylinder 40 on opposite sides of the piston 32.

The valve 34 communicates with the first chamber 44 in the power cylinder 40 through a first two-way flow line 60. The valve 34 further communicates with the second chamber 46 in the power cylinder 40 through a second two-way flow line 62. As further shown schematically in FIG. 1, the valve 34 receives hydraulic fluid from a reservoir 70 and a pump 72 through a hydraulic fluid inlet line 74. A hydraulic fluid outlet line 76 exhausts hydraulic fluid from the valve 34 to the reservoir 70.

The valve 34 operates in a known manner in response to rotation of the input shaft 16 with the vehicle steering wheel. When the input shaft 16 rotates with the steering wheel in a first direction about the axis 29, it rotates slightly relative to the pinion gear 30. The torsion bar 36 flexes to permit such rotation of the input shaft 16 relative to the pinion gear 30. The valve 34 responds to the resulting rotational displacement by opening hydraulic fluid flow paths that extend through the valve 34 from the inlet line 74 to the first two-way flow line 60. The valve 34 simultaneously opens hydraulic fluid flow paths that extend through the valve 34 from the second two-way flow line 62 to the outlet line 76. In this manner, the valve 34 communicates the pump 72 with the first chamber 44 in the power cylinder 40 to pressurize the first chamber 44, and simultaneously communicates the second chamber 46 in the power cylinder 40 with the reservoir 70 to vent the second chamber 46. A resulting flow of hydraulic fluid from the pump 72, and a resulting hydraulic fluid pressure differential acting across the piston 32, cause the piston 32 and the rack 14 to move to the right, as viewed in FIG. 1, along the axis 21. This causes the steering linkage to steer the vehicle wheels in a first direction.

As the rack 14 moves along the axis 21 with the piston 32, the pinion gear 30 rotates in meshing engagement with the rack teeth 38. The pinion gear 30 thus rotates about the axis 29 relative to the input shaft 16 in a follow-up manner so as to cancel the rotational displacement between the pinion gear 30 and the input shaft 16. The valve 34 responds by closing the previously opened hydraulic fluid flow paths. This equalizes the hydraulic fluid pressures acting on the piston 32 in the first and second chambers 44 and 46 in the power cylinder 40, and causes the piston 32 and the rack 14 to stop moving along the axis 21.

When the vehicle wheels are to be steered in an opposite direction, the input shaft 16 is rotated with the steering wheel in an opposite direction about the axis 29, and is again rotated slightly relative to the pinion gear 30 upon flexing of the torsion bar 36. The valve 34 responds by pressurizing the second chamber 46 and by simultaneously venting the first chamber 44. The piston 32 and the rack 14 then move axially to the left, as viewed in FIG. 1. A resulting follow-up rotation of the pinion gear 30 relative to the input shaft 16 causes the valve 34 again to equalize the hydraulic fluid pressures in the two chambers 44 and 46 in the power cylinder 40. The steering gear 10 thus steers the vehicle wheels in directions and amounts corresponding to the directions and amounts of rotation of the steering wheel and the input shaft 16.

As shown in greater detail in FIG. 2, the valve 34 includes a valve core 80 and a valve sleeve 82. Both the valve core 80 and the valve sleeve 82 have cylindrical shapes centered on the axis 29. The valve core 80 is defined by a section of the input shaft 16. The valve sleeve 82 is connected with an upper end portion 84 of the pinion gear 30 (FIG. 1). Accordingly, the valve sleeve 82 rotates relative to the valve core 80 when the pinion gear 30 rotates relative to the input shaft 16.

A radially outer surface 86 of the valve core 80 has four recesses 88 at locations that are equally spaced from each other circumferentially about the axis 29. A radially inner surface 90 of the valve sleeve 82 has a plurality of similar recesses 92. A radially outer surface 94 of the valve sleeve 82 adjoins a surrounding cylindrical inner surface 96 of the housing 12. The outer surface 94 has a plurality of circumferentially extending grooves 98 and recesses 100. A corresponding plurality of ring seals 102 are received in the grooves 98 to seal the recesses 100 from each other. Several passages 104, one of which is shown in FIG. 2, extend through the valve sleeve 82 to communicate certain recesses 100 at the outer surface 94 with certain recesses 92 at the inner surface 90. Accordingly, the valve core 80 and the valve sleeve 82 together define the hydraulic fluid flow paths that extend through the valve 34 between the hydraulic lines 60, 62, 74 and 76.

When the input shaft 16 and the pinion gear 30 rotate relative to each other, as described above, the valve core 80 rotates relative to the valve sleeve 82. The recesses 88 at the outer surface 86 of the valve core 80 rotate relative to the recesses 92 at the inner surface 90 of the valve sleeve 82. The hydraulic fluid flow paths extending through the valve 34 between the hydraulic lines 60, 62, 74 and 76 are then adjusted so that certain flow paths become relatively restricted and certain flow paths become relatively unrestricted. Pressurized flows of hydraulic fluid are thereby directed through the valve 34 between the reservoir 70, the pump 72, and the chambers 44 and 46 in the power cylinder 40, as described above with reference to FIG. 1.

The steering gear 10 is subject to functional deterioration through long term use in a vehicle. Such deterioration results from stress that is caused by the driving conditions experienced by the steering gear 10. The driving conditions include mechanical loads, thermal loads and environmental factors acting upon the steering gear 10. For example, vibrations, the torsion of the steering input, the inertia of the steering linkage, and the pressure of the hydraulic fluid are mechanical loads that act upon the steering gear 10 during each steering maneuver. A particular aspect of the fluid pressure loading is the pressure surge that occurs at each start of the vehicle. Other mechanical loads include suspension loads that are transmitted to the steering gear 10 through the steering linkage at the opposite ends of the rack 14. Thermal loads result from both climatic conditions and the elevated temperatures attained by the hydraulic fluid as it is pressurized during steering maneuvers. Stress can also be caused by the impact of foreign objects such as gravel and the like. Other environmental factors that stress the steering gear 10 include the impingement of rain water, snow, mud and road salt.

The foregoing loads and environmental factors act upon the steering gear 10 in various combinations both sequentially and simultaneously throughout the life of the steering gear 10. The resulting stresses cause wear which, in turn, results in functional deterioration of the steering gear 10. Specifically, wear can occur at each joint or interface of two or more relatively movable portions of the steering gear 10. For example, one such interface is defined by the inner surface 96 (FIG. 2) of the housing 12 and the rotatable outer surface 94 of the valve sleeve 82. Another is defined by the adjoining surfaces of the rotatable input shaft 16 and the surrounding seal 28 (FIG. 1). The rack 14 defines an axially sliding interface with each of the two bushings 20 and each of the two seals 42. Wear can also occur in the pivotal structures of the ball joints 26 and in the accordion-like structures of the boot seals 22. The present invention provides a method of forecasting the long term deterioration of the steering gear 10 that would result from long term wear at these and other locations in the steering gear 10.

The Method

Figure 3:
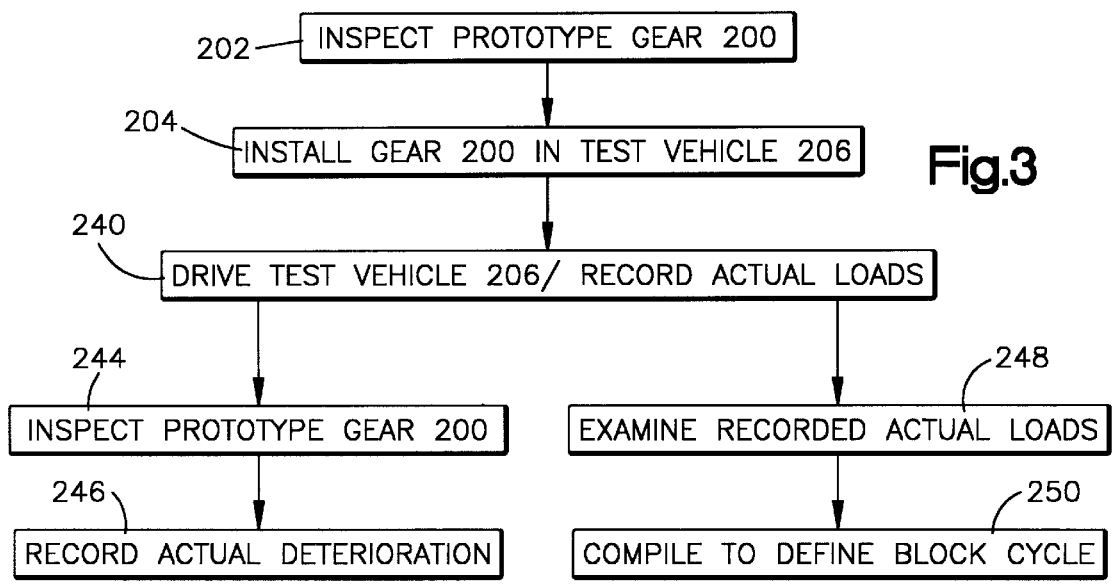
FIG. 3 is a flow chart of steps taken in practicing the present invention.

Several steps taken in practice of the present invention are shown schematically in the flow chart of FIG. 3. These steps are applied to a prototype vehicle steering gear 200 like the steering gear 10 described above.

In the first step 202 shown in FIG. 3, the steering gear 200 is initially inspected by measuring preassembled and/or assembled parts of the steering gear 10 at a plurality of locations where wear is expected to occur. These locations preferably include each interface of relatively moving parts where a significant amount of wear is expected to contribute to functional deterioration of the steering gear 200. Several locations of this type are noted above. For example, the diameters of the cylindrical surfaces 94 and 96 (FIG. 2) could be measured prior to installation of the valve 34 in the housing 12.

In the second step 204 shown in FIG. 3, the steering gear 200 is installed in a test vehicle 206 which is equipped to monitor actual driving conditions, including loads and stress-inducing environmental factors, experienced by the steering gear 200 at the measured locations.

Figure 4:
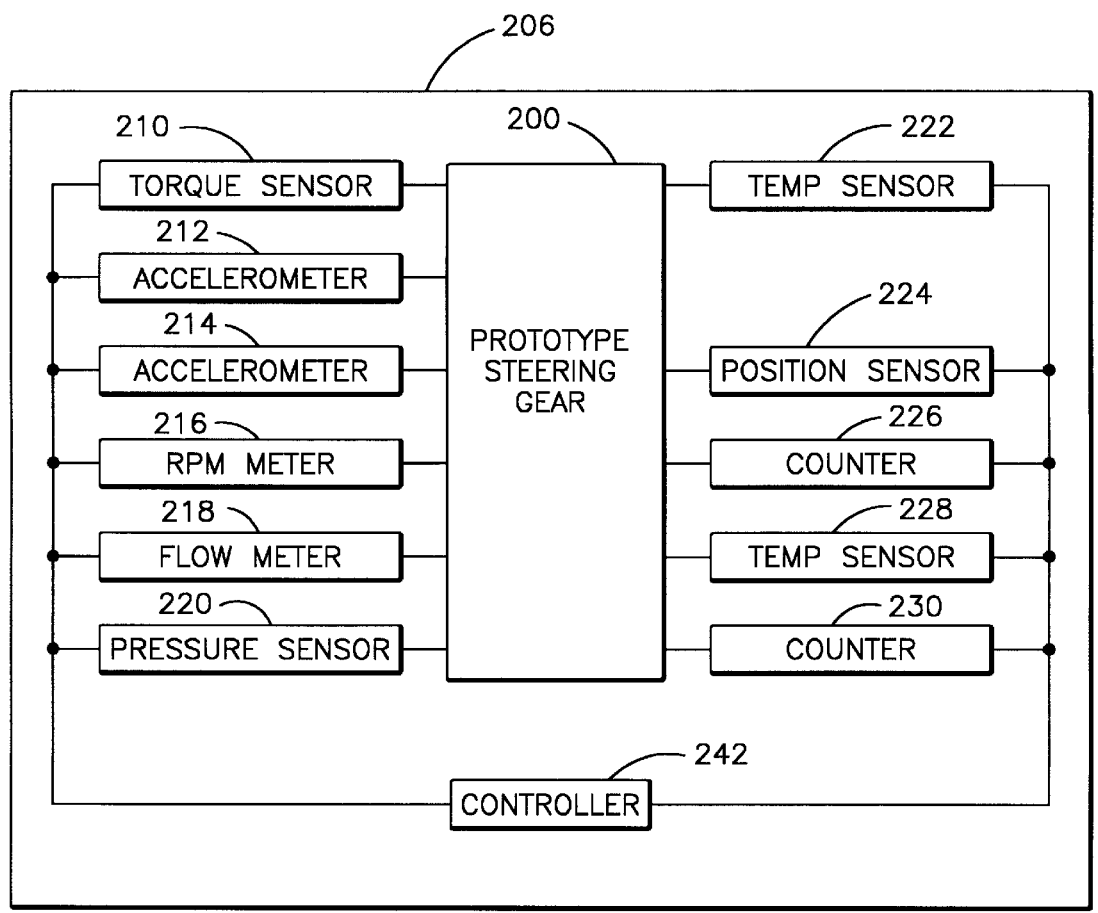
FIG. 4 is a schematic view of a test vehicle used in practicing the present invention.

As shown schematically in FIG. 4, the test vehicle 206 is equipped with a plurality of known sensors. A torque sensor 210 is connected with the input shaft 16 to monitor steering torque and/or steering wheel position. A pair of accelerometers 212 and 214 are connected with the steering gear 200 through the tie rods 24 or the ball joints 26 at the opposite ends of the rack 14. The accelerometers 212 and 214 measure vertical loads during jounce and rebound of the vehicle suspension. Loads attributable to operation of the hydraulic fluid pump 70 are monitored by meters such as an RPM meter 216, a flow meter 218, a pressure sensor 220 and a fluid temperature sensor 222. Loads caused by horizontal movement of the rack 14, and resulting compression and extension of the boot seals 22, are monitored by one or more position sensors 224.

The test vehicle 206 is further equipped with a counter 226 for indicating the number and frequency of ignition key starts and stops. The resulting surges in the hydraulic fluid pressure are indicated accordingly. Other sensors include a temperature sensor 228 for monitoring the ambient temperature, and another counter 230 for monitoring wiper switch starts and stops. The counter 230 can indicate the impingement of water, mud, road salt and the like in terms of wiper use. These sensors 210–230 are shown schematically in FIG. 4 by way of example only, and each may have any suitable structure known in the art.

In the third step 240 shown in FIG. 3, the prototype steering gear 200 is subjected to a predetermined amount of long term use in the test vehicle 206. The predetermined amount of long term use preferably comprises, for example, at least approximately 100,000 driven miles. This amount of driving can be performed on a test track and/or on the road.

A controller 242 (FIG. 4) periodically records driving conditions experienced by the steering gear 200 in terms of the output signals provided by the sensors 210–230 during the predetermined amount of long term use in the test vehicle 206. The recordings are made most extensively when the test vehicle 206 is being driven at or above the 90th percentile of "hard" driving. Those recordings indicate the driving conditions that are most stressful for the steering gear 200. Recordings are also made, although less extensively, when the test vehicle 206 is being driven under conditions that are less stressful for the steering gear 200. The controller 242 thus provides a real time recording of actual driving conditions.

The steering gear 200 is removed from the test vehicle 206 upon completion of the driving step 240. In a following step 244, the steering gear 200 is inspected by measuring it at the same locations where it was initially measured in the first step 202. The initial and subsequent measurements are compared to provide a wear profile comprising the individual amounts of wear, if any, that are found at the measured locations on the steering gear 200. In the next step 246, the wear profile is recorded as a representation of the actual degree of deterioration of the steering gear 204 that was caused by the predetermined amount of long term use in the test vehicle 206.

Other steps 248 and 250 also follow the driving step 240. These include a step 248 in which the actual driving conditions recorded by the controller 242 are analyzed. Specifically, parameters such as magnitude, frequency and duration of the various loads and environmental factors are compared so that relatively significant driving conditions can be distinguished from those that are relatively insignificant.

In the following step 250, the significant driving conditions are compiled from the real time recording of actual driving conditions. Specifically, the significant driving conditions are compiled to define an abridged schedule of corresponding test conditions that can be applied to a duplicate steering gear on a test stand. A schedule of test conditions is referred to in the art as a "block cycle." The significant driving conditions are thus compiled to define a block cycle of corresponding test conditions.

The steps shown in FIG. 3 can be repeated for a plurality of substantially identical prototype steering gears in one or more test vehicles. A recording step similar to the recording step 246 would record an average, mean, or other representative degree of actual deterioration for the prototype steering gears. A compiling step similar to the compiling step 250 would be applied to actual loads recorded for all of the prototype steering gears. This would yield a block cycle of test loads that is based on a more comprehensive sampling of actual driving conditions.

Figure 5:
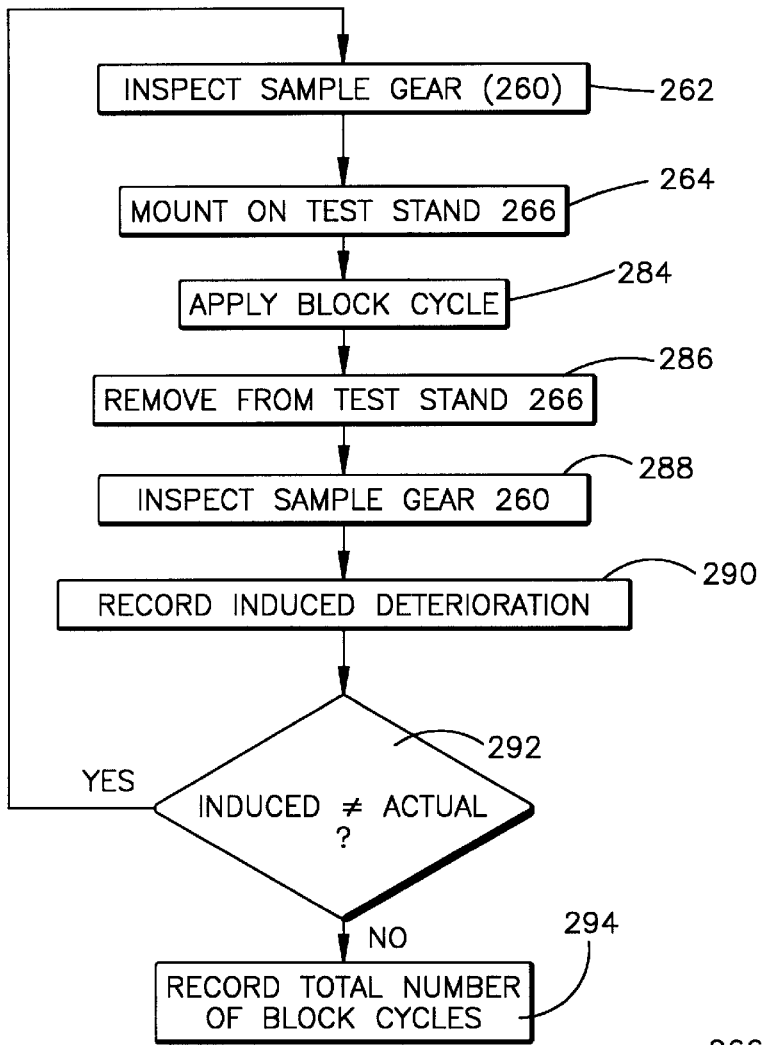
FIG. 5 is a flow chart of other steps taken in practicing the present invention.

Other steps taken in practice of the present invention are shown schematically in the flow chart of FIG. 5. Those steps are applied to a steering gear 260 which is substantially identical to the prototype steering gear 200. Preferably, the steering gear 260 is a representative sample of a production run of steering gears that are substantially identical duplicates of the prototype steering gear 200.

In the first step 262 shown in FIG. 5, the sample steering gear 260 is initially inspected by measuring it at the same locations where the prototype steering gear 200 was measured in steps 202 and 244 shown in FIG. 3. In the next step 264, the sample steering gear 260 is mounted on a test stand 266.

Figure 6:
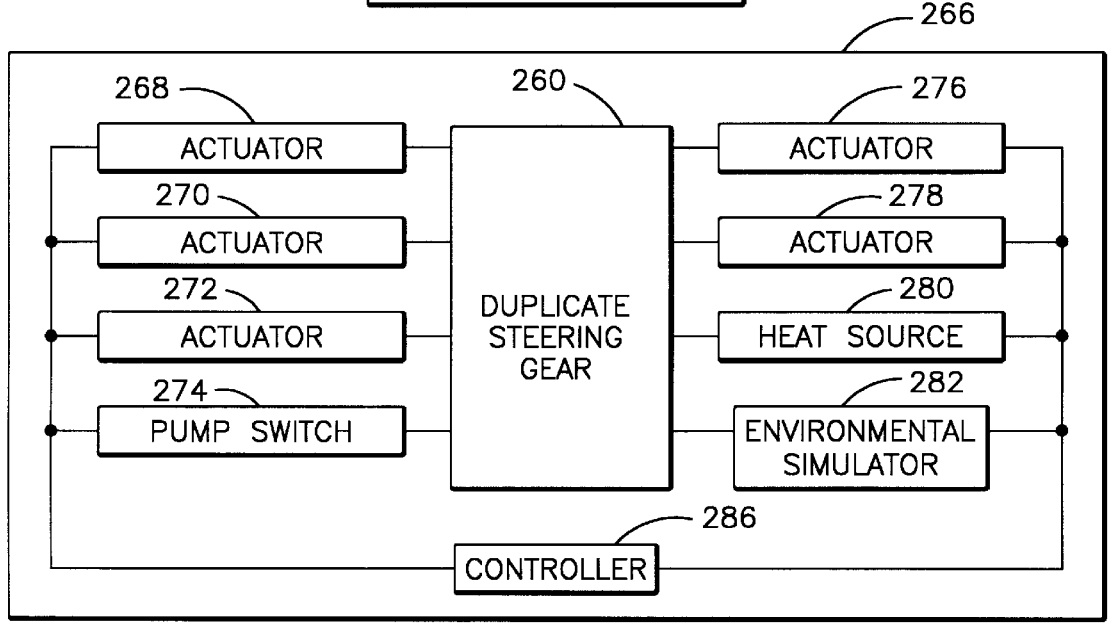
FIG. 6 is a schematic block diagram of a test stand used in practicing the present invention.

As shown schematically in FIG. 6, the test stand 266 is equipped with actuating devices for applying stress-including test conditions to the sample steering gear 260. These include a first mechanical actuator 268 for applying steering torque to the input shaft 16, and a pair of second mechanical actuators 270 and 272 for applying resistance to horizontal movement at opposite ends of the rack 14. The first mechanical actuator 268 preferably comprises an electric motor with an output shaft coupled to the input shaft 16, as known in the art. The second mechanical actuators 270 and 272 could comprise pneumatic or hydraulic motors coupled to corresponding end portions of the rack 14, also as known in the art. A known pump switch 274 actuates the corresponding pump 70.

As thus far described, the test stand 266 comprises a known arrangement of actuating devices 268–274. Such actuating devices are conventionally operated to run a steering gear through repetitive back-and-forth movements of the input shaft 16 and the rack 14. However, in accordance with the present invention, the test stand 266 is further equipped with additional actuating devices that cooperate with the actuating devices 268–274 to run the sample steering gear 260 through the block cycle of stress-inducing test conditions described above.

The additional actuating devices on the test stand 266 include a pair of third mechanical actuators 276 and 278, a heat source 280, and an environmental simulator 282. The third mechanical actuators 276 and 278 apply vertical loads at the opposite ends of the rack 14. The heat source 280 comprises a known apparatus for raising the ambient temperature to elevated levels. The environmental simulator 282 comprises a known apparatus for spraying water, salt water, or the like.

In the third step 284 shown in FIG. 5, the sample steering gear 260 is subjected to test conditions on the test stand 266. Specifically, the sample steering gear 260 is subjected to cumulative test conditions through repetitive applications of the block cycle of test conditions. This step is performed by operating a controller 286 (FIG. 6) with a program that comprises the block cycle of test conditions.

As described above with reference to FIGS. 3 and 4, the actual driving conditions experienced by the prototype steering gear 200 include mechanical loads, thermal loads, and environmental factors that occur both simultaneously and sequentially in the course of 100,000 driven miles. The deteriorating effects of the actual driving conditions may be greater when they are applied simultaneously rather than sequentially. Therefore, the test conditions in the block cycle include corresponding mechanical loads, thermal loads, and environmental factors that occur both simultaneously and sequentially in the block cycle. This helps to ensure that the deteriorating effects of the test conditions closely match the deteriorating effects of the corresponding actual conditions from which they were derived in the steps shown in FIG. 3.

The block cycle of test conditions also includes starts and stops on the test stand 266 that correspond to starts and stops of the test vehicle 206. Specifically, the block cycle directs the controller 286 to operate the pump switch 274 on the test stand 266 with starts and stops corresponding to the ignition starts and stops monitored by the counter 226 (FIG. 4). This causes surges of hydraulic fluid pressure in the sample steering gear 260 that correspond to the surges of hydraulic fluid pressure in the prototype steering gear 200. The block cycle similarly directs the controller 286 to operate the environmental simulator 282 with starts and stops corresponding to the starts and stops of the wiper switch that are monitored by the other counter 230. This causes the environmental factors applied to the sample steering gear 260 to correspond with the environmental factors experienced by the prototype steering gear 200.

The block cycle of test conditions is applied to the sample steering gear 260 throughout a large number of counted repetitions. For example, the block cycle may be applied 100,000 times in step 284. In the next two steps 266 and 288, the sample steering gear 260 is removed from the test stand 266, and is inspected by measuring it again at the same locations where it was initially measured in the first step 262. The initial and subsequent measurements of the sample steering gear 260 are compared to provide a wear profile comprising the individual amounts of wear that are found at the measured locations. In the following step 290, the wear profile is recorded as a representation of the induced degree of deterioration experienced by the sample steering gear 260 on the test stand 266 upon application of a certain number of the block cycles.

In the next step 292 shown in FIG. 5, the induced degree of deterioration of the sample steering gear 260 is compared with the actual degree of deterioration of the prototype steering gear 200. If the induced degree of deterioration is substantially less than or greater than the actual degree of deterioration, then steps 262, 264, 284, 286, 288, 290 and 292 are repeated for another sample steering gear like the sample gear 260. However, a greater or lesser number of block cycles is applied to the other sample steering gear in step 284 in order to induce a correspondingly greater or lesser degree of deterioration. This process would continue until a sample steering gear is found to have an induced degree of deterioration that is substantially the same as the actual degree of deterioration.

The next step 294 shown in FIG. 5 is to record the total number of times that the block cycle was applied in the final application of step 284. Step 294 thus identifies the total number of times that the block cycle must be applied on the test stand 266 in order to apply cumulative test conditions that induce substantially the same degree of deterioration that was caused by the actual driving conditions experienced in the test vehicle 266. Since that degree of deterioration was caused by actual driving conditions experienced throughout the entire course of 100,000 driven miles (in the present example), the total number of block cycles recorded in step 294 is correlated to 100,000 driven miles. It follows that subsequent application of the same number of the block cycles to a duplicate steering gear will simulate actual driving conditions experienced throughout the entire course of 100,000 driven miles. The amount of induced deterioration experienced by such a duplicate steering gear will thus forecast the amount of actual deterioration to be expected for other duplicate steering gears through actual use in vehicles driven 100,000 miles. This is indicated by the additional steps shown schematically in FIG. 7.

Figure 7:
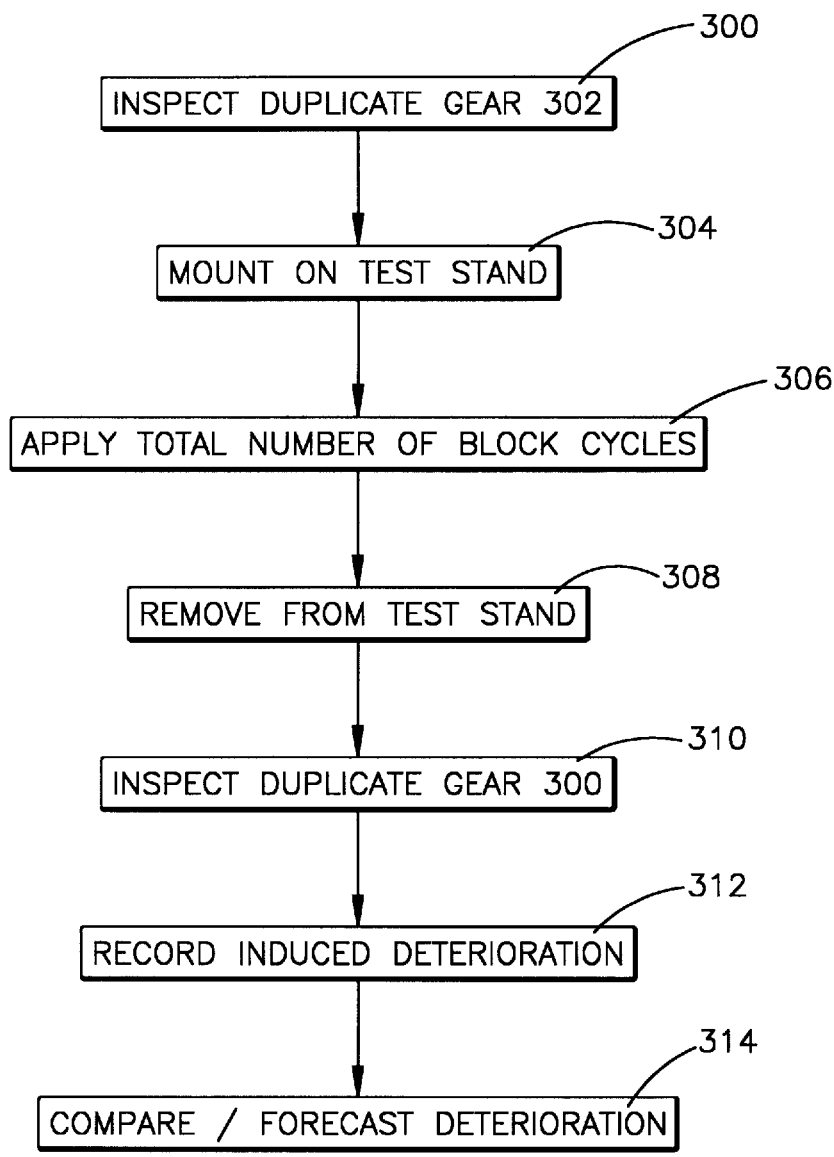
FIG. 7 also is a flow chart of other steps taken in practicing the present invention.

The first step 300 shown in FIG. 7 applies to a duplicate steering gear 302 which is substantially identical to the sample steering gear 260 described above. In the first step 300, the duplicate steering gear 302 is inspected by measuring it at the same locations where the sample steering gear 260 was measured in steps 262 and 288 shown in FIG. 5. In the second step 304 shown in FIG. 7, the duplicate steering gear 302 is mounted on a test stand like the test stand 266 described above with reference to FIG. 4.

In the following step 306, the duplicate steering gear 302 is subjected to repeated applications of the block cycle of test conditions. The block cycle is applied to the duplicate steering gear 302 the total number of times recorded in step 294 of FIG. 5. The duplicate steering gear 302 is thus subjected to cumulative test conditions that simulate actual driving conditions previously experienced by the prototype steering gear 200 throughout 100,000 driven miles of long term use in the test vehicle 206.

In the next two steps 308 and 310 shown in FIG. 7, the duplicate steering gear 302 is removed from the test stand, and is inspected by measuring it again at the same locations where it was initially measured in the first step 300. The initial and subsequent measurements of the duplicate steering gear 302 are compared to provide a wear profile comprising the individual amounts of wear that are found at the measured locations. In the following step 312, the wear profile is recorded as a representation of the induced degree of deterioration experienced by the duplicate steering gear 302 upon application of the predetermined number of the block cycles.

In the final step 314 shown in FIG. 7, the induced degree of deterioration of the duplicate steering gear 302 is compared with the actual degree of deterioration of the prototype steering gear 200. If the induced degree of deterioration does not exceed the actual degree of deterioration by more than a predetermined acceptable amount, then the duplicate steering gear 302 is found to have performed as well as the prototype steering gear 200 when subjected to stress-inducing conditions corresponding to 100,000 driven miles. Since other duplicate steering gears would be expected to have the same long-term reliability as the duplicate steering gear 302, it is then forecast that such other duplicate steering gears also will perform as well as the prototype steering gear 200 under actual driving conditions in vehicles driven 100,000 miles.

From the above description of the invention, those skilled in the art will perceive improvements, changes and modifications. Such improvements, changes and modifications within the skill of the art are intended to be covered by the appended claims.

Having described the invention, the following is claimed:

1. A method comprising the steps of:
    applying cumulative test conditions to a sample vehicle part on a test stand by applying a block cycle of test conditions a plurality of times, said plurality of times being predetermined such that said cumulative test conditions correspond to recorded actual driving conditions previously found to cause a measured degree of deterioration in one or more prototype vehicle parts throughout a predetermined number of driven miles; and
    subsequently inspecting said sample vehicle part to determine an induced degree of deterioration caused by said cumulative test conditions upon said plurality of applications of said block cycle, whereby said induced degree of deterioration corresponds to said predetermined number of driven miles and thus forecasts deterioration to be experienced by duplicate vehicle parts upon use of said duplicate vehicle parts in vehicles throughout said predetermined number of driven miles.

2. A method as defined in claim 1 wherein said block cycle of test conditions comprises an abridged schedule of real time recordings of actual driving conditions experienced by said one or more prototype vehicle parts throughout said predetermined number of driven miles, said abridged schedule of real time recordings representing actual driving conditions that are selected and compiled in distinction from other actual driving conditions.

3. A method as defined in claim 1 wherein said block cycle of test conditions includes mechanical loads, thermal loads, and stress-inducing environmental factors that occur in said block cycle simultaneously.

4. A method as defined in claim 1 wherein said induced degree of deterioration comprises wear at an interface of two relatively movable portions of said sample vehicle part.

5. A method as defined in claim 1 wherein said sample vehicle part is a hydraulic power steering gear.

6. A method as defined in claim 1 wherein said predetermined number of driven miles is at least approximately 100,000 miles.

7. A method comprising steps of:
    recording actual driving conditions experienced by a prototype vehicle part during actual use in a test vehicle over the course of a predetermined number of driven miles;
    inspecting said prototype vehicle part upon completion of said actual use to determine an actual degree of deterioration corresponding to said predetermined number of driven miles;
    selecting and compiling a plurality of said recorded actual driving conditions to define a block cycle of corresponding test conditions comprising an abridged schedule of said recorded actual driving conditions;
    applying said block cycle repeatedly to a duplicate vehicle part on a test stand, and counting the total number of applications of said block cycle, until said duplicate vehicle part experiences an induced degree of deterioration which is substantially the same as said actual degree of deterioration; and
    recording said total number of said applications of said block cycle, whereby said total number of said applications of said block cycle can be used to cause another duplicate vehicle part to experience an induced degree of deterioration which is correlated to the actual use in the vehicle over the course of said predetermined number of driven miles.

8. A method as defined in claim 7 wherein said actual degree of deterioration comprises wear at an interface of two relatively movable portions of said prototype vehicle part.

9. A method as defined in claim 7 wherein said actual driving conditions include mechanical loads, thermal loads, and stress-inducing environmental conditions that are experienced by said prototype vehicle part simultaneously, and said block cycle includes corresponding mechanical loads, thermal loads, and stress-inducing environmental conditions that occur in said block cycle simultaneously.

10. A method as defined in claim 7 wherein said actual driving conditions include loads attributable to vehicle ignition starts and stops, said recording step recording said starts and stops, said block cycle including test loads having corresponding starts and stops.

11. A method as defined in claim 7 wherein said prototype vehicle part and said duplicate vehicle parts are hydraulic power steering gears.

12. A method as defined in claim 7 wherein said predetermined number of driven miles is at least approximately 100,000 miles.

13. A method comprising steps of:

recording actual driving conditions experienced by a prototype vehicle part during actual use in a vehicle over the course of a predetermined number of driven miles;

inspecting said prototype vehicle part upon completion of said actual use to determine an actual degree of deterioration corresponding to said predetermined number of driven miles;

compiling said recorded actual driving conditions to define a block cycle of corresponding test conditions; and applying said block cycle to a duplicate vehicle part on a test stand a plurality of times so as to cause said duplicate vehicle part to experience an induced degree of deterioration which is substantially the same as said actual degree of deterioration, whereby said plurality of applications of said block cycle can be used to cause another duplicate vehicle part to experience said induced degree of deterioration which is correlated to the actual use in the vehicle over the course of said predetermined number of driven miles;

said actual driving conditions including mechanical loads, thermal loads, and stress-inducing environmental conditions that are experienced by said prototype vehicle part simultaneously, said block cycle applied to said duplicate vehicle part including corresponding mechanical loads, thermal loads, and stress-inducing environmental conditions that occur simultaneously;

said environmental conditions include the impingement of rain water, said recording step recording vehicle wiper switch starts and stops, said block cycle including water impingement test conditions having corresponding starts and stops.

14. A method comprising steps of:

recording actual driving conditions experienced by a prototype vehicle part during actual use in a vehicle over the course of a predetermined number of driven miles;

inspecting said prototype vehicle part upon completion of said actual use to determine an actual degree of deterioration corresponding to said predetermined number of driven miles;

compiling said recorded actual driving conditions to define a block cycle of corresponding test conditions; and applying said block cycle to a duplicate vehicle part on a test stand a plurality of times so as to cause said duplicate vehicle part to experience an induced degree of deterioration which is substantially the same as said actual degree of deterioration, whereby said plurality of said applications of said block cycle can be used to cause another duplicate vehicle part to experience said induced degree of deterioration which is correlated to the actual use in the vehicle over the course of said predetermined number of driven miles;

said prototype vehicle part and said duplicate vehicle parts being hydraulic power steering gears, said predetermined number of driven miles being at least approximately 100,000 miles.

* * * * *